United States Patent
Vincent et al.

(10) Patent No.: US 8,990,619 B1
(45) Date of Patent: Mar. 24, 2015

(54) METHOD AND SYSTEMS TO PERFORM A ROLLING STACK UPGRADE

(75) Inventors: Jean-Francois Vincent, Cupertino, CA (US); Jie Jiang, San Jose, CA (US); Marco Foschiano, Pinerolo (IT); Ali Ahmad Tareen, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 13/401,416

(22) Filed: Feb. 21, 2012

(51) Int. Cl.
*G06F 11/00* (2006.01)
*G06F 9/445* (2006.01)

(52) U.S. Cl.
CPC ........................................ *G06F 8/65* (2013.01)
USPC ............................................. 714/19; 717/171

(58) Field of Classification Search
USPC ............................................................ 714/19
See application file for complete search history.

(56) References Cited

U.S. PATENT DOCUMENTS

| | | | |
|---|---|---|---|
| 2005/0193137 A1* | 9/2005 | Farnham | 709/230 |
| 2008/0259917 A1* | 10/2008 | Hua et al. | 370/389 |
| 2011/0320605 A1* | 12/2011 | Kramer et al. | 709/226 |

\* cited by examiner

*Primary Examiner* — Jigar Patel
(74) *Attorney, Agent, or Firm* — Merchant & Gould (57) ABSTRACT

Stackable Layer 2 switches may be upgraded through a stateless upgrade procedure that minimizes software upgrade complexity while leveraging the intrinsic redundancy of the network to minimize traffic disruption. Disclosed methods may be targeted to platforms that lack support for other non-disruptive upgrade technologies, but that can leverage the intrinsic network redundancy to minimize traffic impact during a stack upgrade.

15 Claims, 5 Drawing Sheets

METHOD AND SYSTEMS TO PERFORM A ROLLING STACK UPGRADE

BACKGROUND

Customers that operate critical equipment in communication with a network (e.g., hospitals, government agencies, financial institutions, etc.) need the ability to upgrade a stack in a minimally disruptive way. There is a need for a stateless upgrade procedure that minimizes software upgrade complexity while leveraging the intrinsic redundancy of the network to minimize traffic disruption.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Consistent with embodiments of the present disclosure, systems and methods are disclosed for rolling stack upgrade procedures.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Customers operating critical network systems usually have a certain amount of redundancy of communication between the end hosts and access layer network devices. End hosts may include wired or wireless network devices. Access layer network devices may include wireless access points. In some embodiments, wireless access point may have partially overlapping are coverage.

Such redundancy may result in significant disruption to the critical service when stacks connected to the network devices are upgraded. This is due to all members of the stack being affected by the upgrade procedure at the same time.

Dual-attached hosts (dual-homed through either wireless or wired connections) may be impacted if both of the connections are affected. This situation may occur when both connections are running through the same stack (even if the corresponding stack members are different) where the stack is experiencing an upgrade procedure.

As such, there is a need for a procedure to upgrade one stack member at a time, such that at a specific moment in time, only the connections going through the currently upgraded stack are affected by the downtime. In other words it is only acceptable that such connection be down for the amount of time necessary to upgrade the corresponding stack member. Connections going through other member stacks at the same time should not be affected.

Embodiments of the present disclosure employ a rolling stack upgrade applicable to stacks that are used in network designs based on stacked Layer 2 access switches connected in a redundant fashion to a distribution layer through two uplinks configured in a forwarding-blocking pair by STP, FlexLinks, or REP. In some embodiments, end hosts may be single-attached as an access point or dual-attached to the stack, such as a server. Cross-stack EtherChannels may also be employed both for uplinks and downlinks.

Embodiments of the present disclosure effectuate the rolling stack upgrade thorough the use of logical stack splits. A logical stack split involves logically segmenting a stack into an upgraded segment portion and a non-upgraded segment portion. The upgrade may then be performed one stack member at a time, while keeping the other stack members running with the previous pre-upgrade software. Once the stack member has been upgraded, the stack member moves from the non-upgraded segment portion to the upgraded segment portion. The process may be repeated until all of the members comprise a fully upgraded stack. In the case of any failures during the rolling stack upgrade, embodiments of the disclosure contemplate a roll back recovery process that works in the reverse order to restore the previous fully non-upgraded stack.

During the rolling stack upgrade, either segment's control plane may communicate with the other. However, the data planes may be blocked, such that no data forwarding is allowed between the two segments. Furthermore, two instances of software running stack management protocols may be running on the two segments. Each of the active stack management software protocols treat the two segments as two separate stacks for all normal procedures except those that may be strictly related to the upgrade process.

The two segments may work and independently and interact individually with the other network protocols and devices. In some embodiments, MAC persistency may be enabled to avoid breaking network connectivity. In this case, STP, LACP, and CDP may use the same identifiers in both segments. Correspondingly, L3 interfaces on the upgraded segment may be temporarily kept inactive.

In the case where STP or FlexLinks is used on the uplinks, proper protocol transitions (e.g., from forwarding to blocking and vice versa) need to be controlled to avoid creating network loops or back-holes. Similarly, simple Etherchannel state machine control may be employed to guarantee connectivity upstream and downstream through cross-stack port channels during the rolling stack upgrade sequence.

In addition, during a rolling stack upgrade procedure, the upgraded segment may be reachable from the non-upgraded segment's master switch console session. Such communication allows for basic administration and troubleshooting.

It may be critical for rolling stack upgrade logic to determine the sequence of stack member upgrades based on network connectivity and on mastership status. The rolling stack upgrade logic may automatically determine the best upgrade sequence to minimize traffic disruption as well as avoid any unnecessary master elections.

Figure 1:
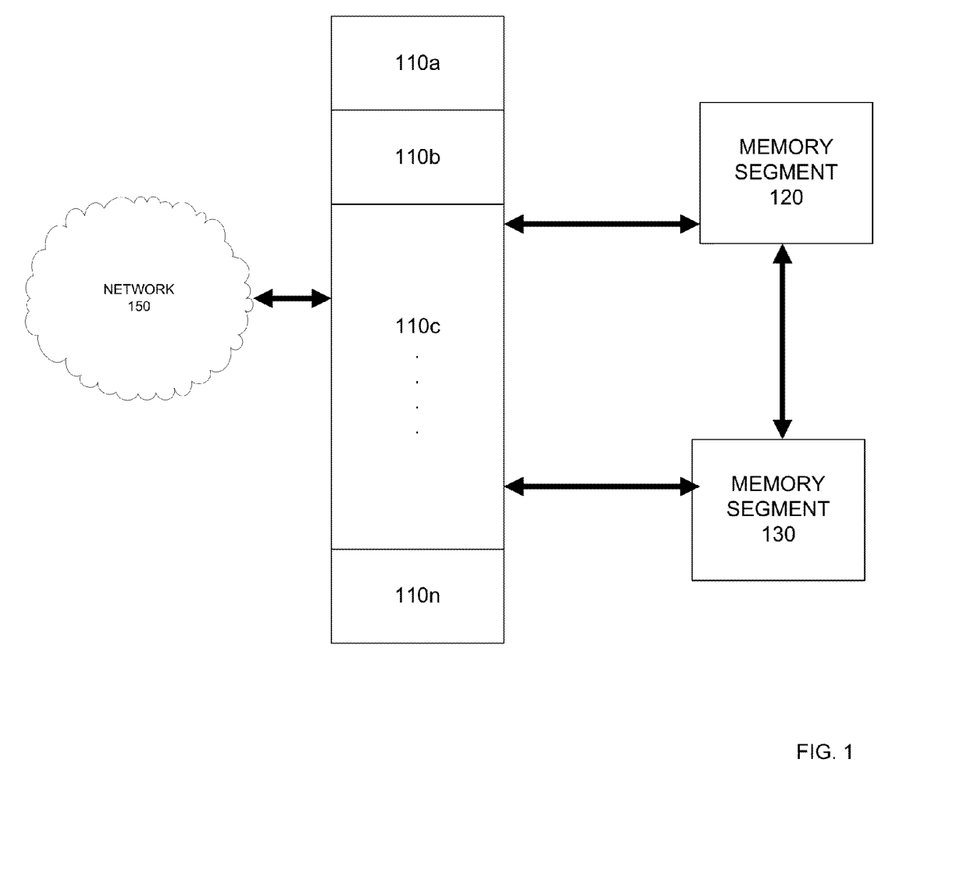
FIG. 1 is an illustration of an operating environment for embodiments described herein.

FIG. 1 illustrates a sample operating environment for embodiments of the present disclosure. A plurality of network devices, such as network devices 110a-110n may exist in a stack 105. Stack 105 may be in communication with a plurality of other network devices 140a-140e across a network 150 may comprise any appropriate communications network on which a plurality of devices may be in communication with one another, such as the Internet.

A first memory segment 120 may be in communication with stack 105. It should be understood that first memory segment 120 may be part of a network device that may or may not be directly associated with stack 105. For example, first memory segment 120 may be contained on a network device that is in communication with the members of stack 105. First memory segment 120 may be allotted to hold identification of stack members that are scheduled for upgrade, but that have not yet been upgraded.

Similarly, a second memory segment 130 may be in communication with stack 105. It should be understood that second memory segment 130 may be in communications with both first memory segment 120 and stack 105. Second memory segment 130 may be allotted to hold identification of stack members that have been upgraded and moved from first memory segment 120.

Figure 2:
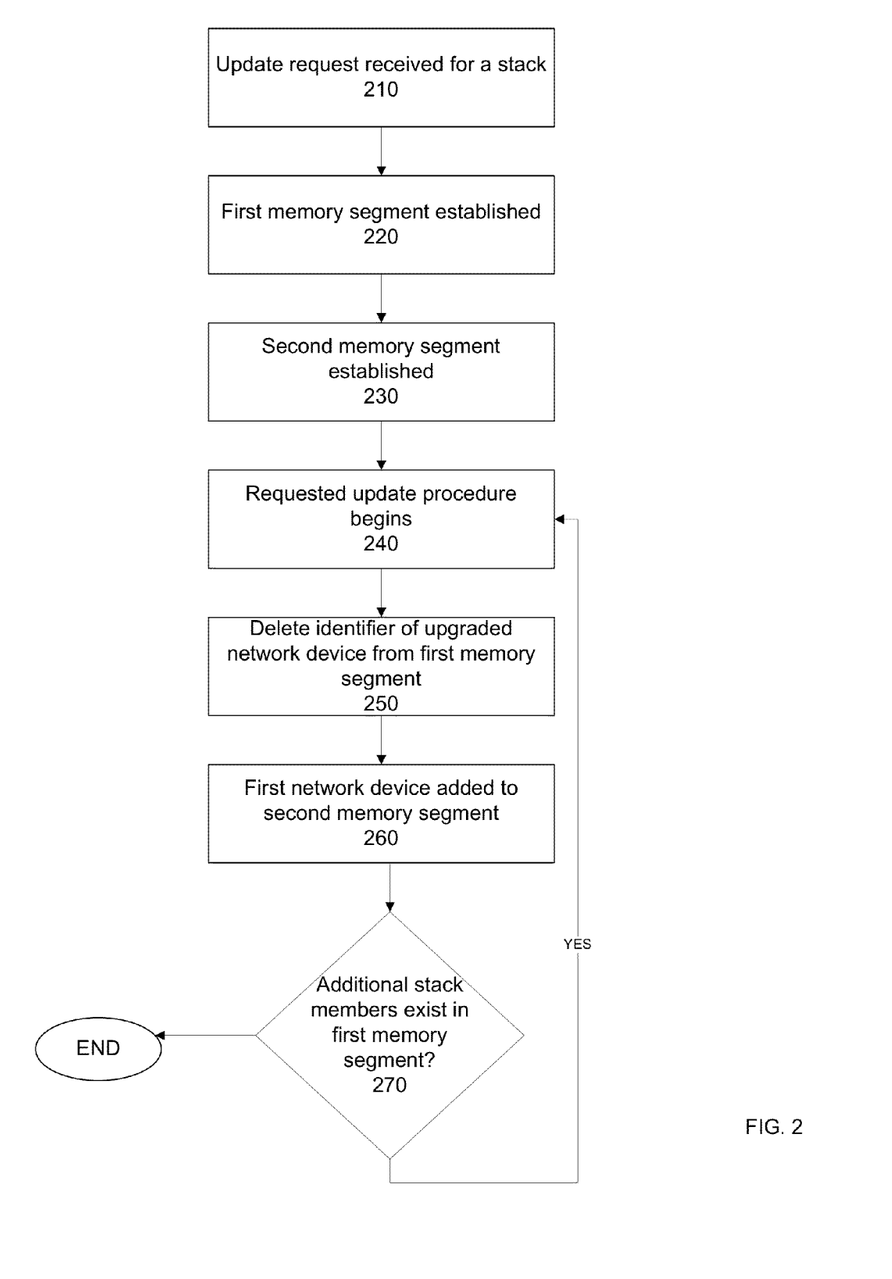
FIG. 2 is a flow chart of embodiments for providing a dynamic space.

FIG. 2 is a flow chart illustrating embodiments of the present disclosure. Method 200 may begin at step 210 where an update request may be received for a stack comprising a plurality of network devices. In some embodiments the plurality of network devices may comprise stacked Layer 2 network devices connected in a redundant fashion. The stack itself may be connected to a distribution layer via two uplinks configured in a forward blocking pair. In some embodiments, the network devices may comprise wireless access points.

The upgrade request may be sent automatically from a software provider, may be manually requested by a customer, implemented through a directly loaded software program, or any other means known to provide updated/upgraded software to a plurality of devices. In some embodiments, the upgrade may be related to a newer version of previously distributed software.

Method 200 may then proceed to step 220. At step 220, a first memory segment may be established. The first memory segment may initially comprise identifiers identifying each member of the stack that has been designated for upgrade. In some embodiments, the identifiers may be numeric, text, or any other identifier suitable to uniquely identify each of the stack members. Prior to the implementation of the upgrade, the first memory segment should contain identifiers for each member of the stack to be upgraded.

Method 200 may then proceed to step 230. At step 230, a second memory segment may be established in a similar fashion as the first memory segment. The second memory segment will initially be empty, but will be employed to store identifiers for each stack member that has completed the upgrade process.

In some embodiments, the control plane of the first memory segment may be in communication with the control plane of the second memory segment. At the same time it may be desirable to prevent data forwarding between the first memory segment and the second memory segment.

Furthermore, a first stack manager may operate on the first memory segment and a second stack manager may operate on the second memory segment. The stack managers may operate the respective memory segments as separate stacks for all procedures not directly related to the upgrade process. In other words, the stack managers operate the stacks as if they were under normal conditions, save for the upgrade. To wit, the first memory segment and the second memory segment may each communicate individually with the plurality of connected network devices not contained in the stack.

Method 200 may then proceed to step 240. At step 240, the requested update procedure may begin on a first network device identified in the first memory segment. In some embodiments, the stack members to be updated may be prioritized based on network connection status and stack mastership information relating to the identification of a master network device within the stack. The update procedure may be anything from a simple update of the underlying software code to a wholesale replacement.

When the first network device has completed the update procedure, method 200 may proceed to step 250. At step 250, the identifier of the upgraded first network device may be deleted from the first memory segment. Subsequently, at step 260, the identifier of the upgraded first network device may be added to the second memory segment.

At step 270, it may be determined whether or not there exist additional stack members identified in the first memory segment. If no more stack members reside in the first memory segment, the upgrade has completed and all stack members should be updated. If additional stack members exist in the first memory segment, method 200 may return to step 240 and continue to update the remaining stack members until completion. It should be understood that during the update of one member of the stack, the remaining members of the stack should all be operating according to normal procedure.

In some embodiments, during the rolling stack upgrade, MAC persistency may be enabled to ensure that connections may be maintained throughout the upgrade process. Furthermore, common identifiers may be used for both the first memory segment and the second memory segment. The common identifiers may allow for symmetry while working within various network protocols. In some embodiments, an Etherchannel state machine may be employed to further ensure connectivity between cross-stack port channels.

In certain instances, a failure may occur during the upgrade process. If such a failure is detected during a rolling stack update, a roll-back recovery process may be implemented to recreate the stack to its pre-updated condition.

Figure 3:
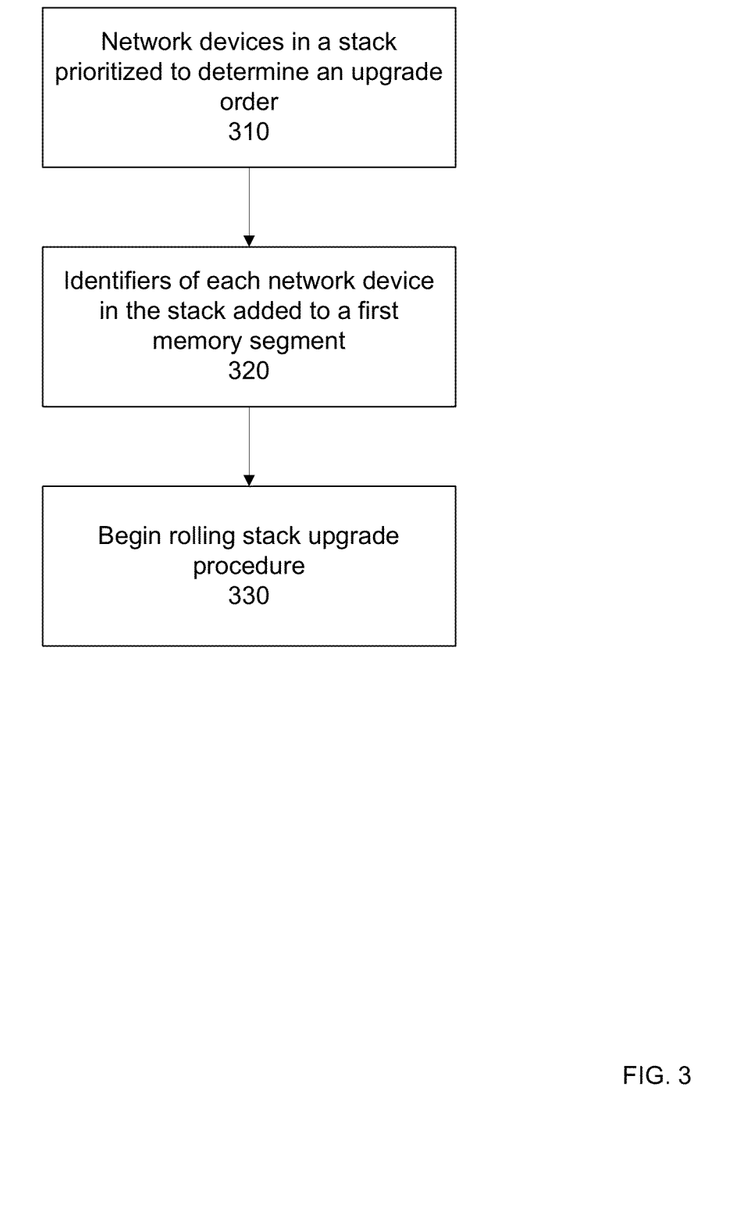
FIG. 3 is a flow chart of embodiments for providing a dynamic space.

FIG. 3 is a flow chart illustrating embodiments of the present disclosure. Method 300 may begin at step 310 where a plurality of network devices in a stack may be prioritized to determine an upgrade order. As discussed above the prioritization may be based on network connection status and stack mastership information.

Method 300 may then proceed to step 320. At step 320, identifiers of each network device in the stack may be added to a first memory segment. Next, at step 330, the rolling stack upgrade procedure may begin. As discussed in detail above, the procedure may comprise sequentially performing the update procedure on the stack members identified in the first memory segment. As each stack member is upgraded, the identifier of the stack member may be added to a second memory segment. Also, the identifier of the stack member may then be deleted from the first memory segment. In some embodiments, the second memory segment may be made available to a master switch device associated with the first memory segment.

Described embodiments of the present disclosure may be applicable to stacks that are used in standard network designs based on stacked L2 access switches connected in a redundant fashion to the distribution layer by means of two uplinks configured in a forwarding-blocking pair by STP, FlexLinks or REP. The end devices can be single-attached (e.g., an access point) or dual-attached (e.g., a server) to the stack. Cross-stack EtherChannels may be employed both as uplinks and as downlinks.

Figure 4:
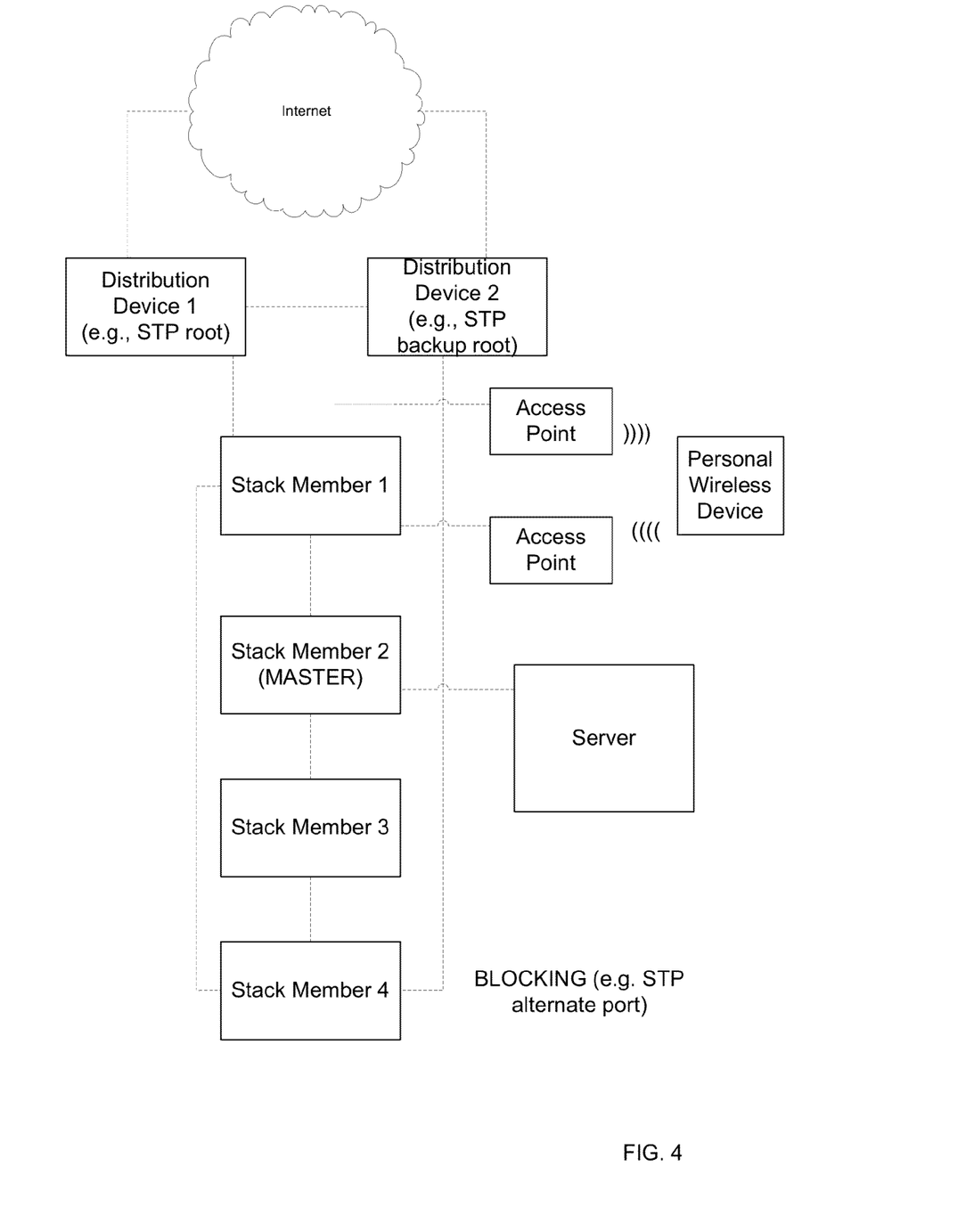
FIG. 4 is a flow chart of embodiments for providing a dynamic space.

FIG. 4 illustrates additional topologies for implementations of embodiments described in the present disclosure. In preparation of an upgrade, if VLAN load balancing is used on the stack uplinks, a command may be provided to switch to an active-standby configuration in a minimally disruptive fashion. The same command may be used after the upgrade to restore the original load balancing configuration.

For example, with STP, such a command would make one uplink the root port for all the VLANs it carries, while it would make the other uplink an alternate port for all the VLANs. Similarly, the same (or a similar) command as the aforementioned one may then be used to mark the active uplink and the corresponding member as ACTIVE. Furthermore, the command may mark the blocking uplink and corresponding member as STANDBY. Members with a blocking uplink or no uplink at all may be referred to as non-active-non-standby or NANS.

The upgrade procedure may be started from the STANDBY member first. An image may be identified to be used for the upgrade and the procedure may be started with a special command on the designated master switching device. The last switch to be upgraded will be the ACTIVE switch.

Embodiments of the present disclosure can minimize the number of stack master re-elections. The Master should be configured to be the ACTIVE switch (the last device to be upgraded) or the last NANS switch to be upgraded (in case it is preferred to have the uplinks on non-master switches). The backup master (the one with the next highest priority) should be configured to be the STANDBY switch (the first to be upgraded) or the first NANS switch to be upgraded (in case it is preferred to have the uplinks on non-master switches).

A stack-wide finite state machine ("FSM") may drive the progress of the upgrade procedure. For example, STANDBY may be logically split from the rest of the stack first, then upgraded. The first adjacent NANS subsequently is also split, upgraded, and added to the STANDBY to form an upgraded 2-switch segment. A second NANS is then split and upgraded. This process may continue until only the ACTIVE is left, at which point it too will be upgraded and added to the upgraded segment. At that point, the upgrade procedure may be considered to be concluded.

It should be noted that when an EtherChannel device switchover happens from hot standby to active state, in order to minimize the reconvergence time, it may be desired to use the generation of dummy multicast packets to have the an EtherChannel MAC addresses relearned along the UPGRADED STANDBY uplink path.

Furthermore, when an EtherChannel switchover happens from hot standby to active state, in order to minimize disruption to multicast traffic, it may be desired to generate proxy IGMP/MLD reports and learning of the UPGRADED STANDBY uplink.

As soon as the last member of the unupgraded segment is reloaded, the master of the upgraded segment can take over Layer 3 connectivity and mastership of the entire stack. The uplink of the new ACTIVE must remain forwarding even after the previous ACTIVE rejoins the now-upgraded stack to prevent connectivity disruption. Protocols/features like STP must be prevented from performing any on-the-fly preemption of the new ACTIVE uplink in favor of the previous ACTIVE uplink, even if the link priorities were to favor the old ACTIVE uplink.

To preserve stability, an automatic link priority change may be performed to now favor the new ACTIVE uplink, which must remain forwarding packets. VLAN load balancing can then be restored manually by using the aforementioned new command.

It should be noted that the IEEE hot-standby mode may be used for any EtherChannel member, whether connected to an end host or to a distribution switch, when an EtherChannel is split between the upgraded segment and the unupgraded segment.

In case LACP were not used to form and maintain the EtherChannel, then an equivalent FSM may be implemented to support the 1-active-N-standby EtherChannel member transitory configuration. In some embodiments, the ideally-to-be-hot-standby member will have to be kept down instead (since incapable of hot standby mode) and the end device will experience a link down when a switchover occurs.

LACP uses the MAC address of one of the port channel member's MAC address. In order to maintain the port channel's integrity and to avoid channel misconfiguration, the same MAC address on the port channel should be maintained on both the segments of the stack. For example, switches could have 48 layer-2 port channels. So, the MAC address of all 48 port channels would be maintained on both members of the stack.

In some embodiments of LACP, the port channel's MAC address is the physical MAC address of the first port joining the port channel group. When the stack is getting upgraded using rolling stack upgrade option, the MAC address of the port channel should remain the same even if the port whose MAC address is being used by the port channel leaves the un-upgraded segment of the stack and joins the upgraded segment of the stack.

For example, Gi1/0/1 and Gi2/0/1 may be part of same LACP group and the port channel may be using Gi1/0/1's physical MAC address as its MAC address. However, when switch is upgraded, Gi1/0/1's MAC address may be removed and Gi2/0/1's MAC address would be selected as the port channel's MAC address. This could cause a port channel misconfiguration as when Gi1/0/1 joins the upgraded segment of the stack then the same channel would be using two different Mac addresses.

Embodiments of the present disclosure address this problem by maintaining Gi1/0/1's physical MAC address as port channel's MAC address. In this way, the same port channel on both the stack segments would use the same MAC address and avoid the potential channel misconfiguration In another example, Gi1/0/1 and Gi2/0/1 may be part of same LACP group and the port channel is using Gi2/0/1's MAC address as its MAC address. On the un-upgraded segment, nothing would happen when Gi1/0/1 leaves the stack as port channel would continue to use Gi2/0/1's Mac address. However, when Gi1/0/1 joins the upgraded segment of the stack, the same port channel would use Gi1/0/1's MAC address as its MAC address on the upgraded segment of the stack. This may result in channel misconfiguration as same port channel would use two different MAC addresses.

Embodiments of the present disclosure also address this problem. When Gi1/0/1 joins the upgraded segment of the stack, the master on the upgraded segment of the stack should know the MAC address of the port channel (which has Gi1/0/1 as its member) and assign the same MAC address that is currently being used by the same port channel on the un-upgraded segment of the stack.

Figure 5:
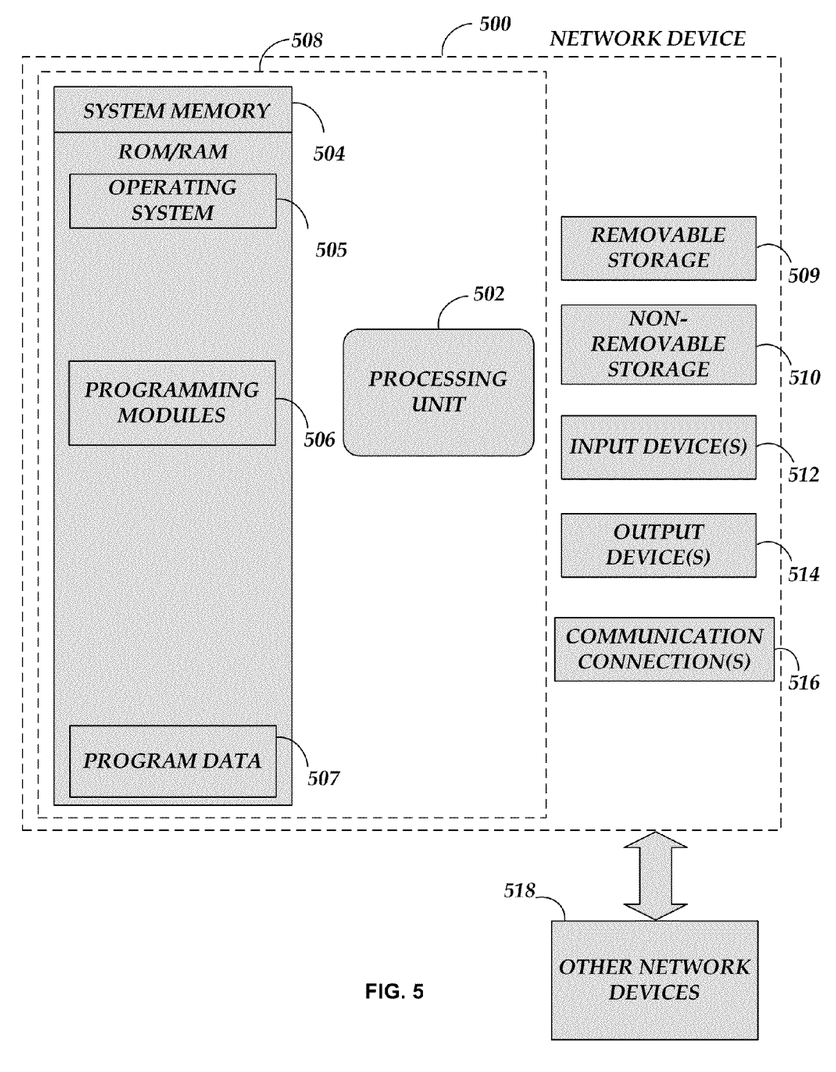
FIG. 5 is a block diagram of a network computing device.

FIG. 5 is a block diagram of a system including network device 500. Consistent with embodiments of the present disclosure, the aforementioned memory storage and processing unit may be implemented in a network device, such as network device 500 of FIG. 5. Any suitable combination of hardware, software, or firmware may be used to implement the memory storage and processing unit. For example, the memory storage and processing unit may be implemented with network device 500 or any of other network devices 518, in combination with network device 500. The aforementioned system, device, and processors are examples and other systems, devices, and processors may comprise the aforementioned memory storage and processing unit, consistent with embodiments of the present disclosure.

With reference to FIG. 5, a system consistent with embodiments of the present disclosure may include a network device, such as network device 500. In a basic configuration, network device 500 may include at least one processing unit 502, a secure processing unit for decryption 520, and a system memory 504. Depending on the configuration and type of network device, system memory 504 may comprise, but is not limited to, volatile (e.g., random access memory (RAM)), non-volatile (e.g., read-only memory (ROM)), flash memory, or any combination. System memory 504 may include operating system 505, one or more programming modules 506, and may include program data 507. Operating system 505, for example, may be suitable for controlling network device 500's operation. Furthermore, embodiments of the present disclosure may be practiced in conjunction with a graphics library, other operating systems, or any other application program and is not limited to any particular application or system. This basic configuration is illustrated in FIG. 5 by those components within a dashed line 508.

Network device 500 may have additional features or functionality. For example, network device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 500. Any such computer storage media may be part of device 500. Network device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Network device 500 may also contain a communication connection 516 that may allow device 500 to communicate with other network devices 518, such as over a network in a distributed network environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502 or secure processing unit for decryption 520, programming modules 506 may perform processes including, for example, one or more method 200 and 300's stages as described above. The aforementioned process is an example; processing unit 502 and secure processing unit for decryption 520 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:

1. A method comprising:
   receiving an upgrade request for a stack comprising a plurality of network devices;
   establishing a first memory segment comprising identifiers for stack members that have been designated for upgrade according to the upgrade request;
   performing a requested update procedure on a first network device in the stack;
   establishing a second memory segment comprising an identifier of the updated first network device, wherein a control plane of the first memory segment is in communications with a control plane of the second memory segment;
   deleting the identifier of the updated first network device from the first memory segment;
   preventing data forwarding between the first memory segment and the second memory segment;
   operating a first stack manager on the first memory segment;
   operating a second stack manager on the second memory segment, wherein the first stack manager and the second stack manager operate the respective stacks as separate stacks for all procedures not directly related to the upgrade process;
   sequentially performing the requested update procedure on the remaining members of the first memory segment until the first memory segment is empty, wherein upon update of each individual network device performing the steps of:
      adding the identifier of the individual network device to the second memory segment; and
      deleting the identifier of the individual network device from the first memory segment.

2. The method of claim 1, wherein the plurality of network devices are stacked Layer 2 network devices connected redundantly.

3. The method of claim 2, further comprising connecting the stack to a distribution layer via two uplinks configured in a forward-blocking pair.

4. The method of claim 1, further comprising receiving the system identifier information as a response to link-state advertisements in a link-state routing protocol.

5. The method of claim 2, wherein the plurality of network devices comprise wireless access points.

6. The method of claim 1, further comprising:
   operating all members of the stack normally except for the stack member currently being upgraded.

7. The method of claim 1, further comprising:
   detecting an error during a stack update; and
   performing a roll-back recovery process to recreate the stack to its pre-upgrade condition.

8. The method of claim 1, wherein the first memory segment and the second memory segment communicate individually with a plurality of network devices not contained in the stack.

9. The method of claim 8, further comprising:
   enabling MAC persistency; and
   using common identifiers in both the first memory segment and the second memory segment for network protocol usage.

10. The method of claim 1, further comprising:
    implementing an Etherchannel state machine to ensure connectivity between cross-stack port channels.

11. The method of claim 1, further comprising:
    determining a sequence for stack member upgrades based on network connectivity and stack mastership information.

12. A method comprising:
    prioritizing a plurality of network devices in a stack to determine an upgrade order;
    adding identifiers of each network device in the stack to a first memory segment;
    performing a rolling stack upgrade to upgrade the stack in the upgrade order, wherein the rolling stack upgrade comprises:
    sequentially performing the update procedure on the stack members identified in the first memory segment;

as each stack member is upgraded:
adding the identifier of the stack member to a second memory segment; and
deleting the identifier of the stack member from the first memory segment;
operating a first stack manager on the first memory segment; and
operating a second stack manager on the second memory segment, wherein the first stack manager and the second stack manager operate the respective stacks as separate stacks for all procedures not directly related to the upgrade process.

13. The method of claim 12, further comprising:
making the second memory segment available from a master switch associated with the first memory segment.

14. An apparatus comprising:
a first memory segment;
a second memory segment and
a processor, wherein the processor is configured to:
receive an upgrade request for a stack comprising a plurality of network devices;
designate the first memory segment for stack members that have been designated for upgrade according to the upgrade request;
designate the second memory segment for stack members that have been successfully upgraded;
perform a requested update procedure sequentially on each stack member;
operate a first stack manager on the first memory segment;
operate a second stack manager on the second memory segment, wherein the first stack manager and the second stack manager operate the respective stacks as separate stacks for all procedures not directly related to the upgrade procedure;
delete the identifier of each updated stack member from the first memory segment;
add the identifier of each updated stack member to the second memory segment.

15. The apparatus of claim 14, wherein the processor is further configured to perform the sequential update procedure until the first memory segment is empty.

\* \* \* \* \*